(12) United States Patent
Komatsu et al.

(10) Patent No.: US 6,889,782 B2
(45) Date of Patent: May 10, 2005

(54) TRACTOR

(75) Inventors: Masakazu Komatsu, Osaka (JP); Yuuji Kitasaka, Osaka (JP); Susumu Nochi, Osaka (JP); Yukio Kubota, Osaka (JP); Susumu Akashima, Osaka (JP)

(73) Assignee: Yanmar Agricultural Equipment Co., Ltd., Osaka (JP)

( * ) Notice: Subject to any disclaimer, the term of this patent is extended or adjusted under 35 U.S.C. 154(b) by 21 days.

(21) Appl. No.: 10/380,233

(22) PCT Filed: Oct. 12, 2001

(86) PCT No.: PCT/JP01/09015

§ 371 (c)(1),
(2), (4) Date: Apr. 17, 2003

(87) PCT Pub. No.: WO02/32712

PCT Pub. Date: Apr. 25, 2002

(65) Prior Publication Data

US 2003/0173132 A1 Sep. 18, 2003

(30) Foreign Application Priority Data

Oct. 19, 2000 (JP) .......................... 2000-319112
Jul. 2, 2001 (JP) .......................... 2001-200364

(51) Int. Cl.$^7$ ................................ B62D 6/00
(52) U.S. Cl. ........................................ 180/6.2
(58) Field of Search ................ 180/6.64, 6.2, 180/6.66, 6.7

(56) References Cited

U.S. PATENT DOCUMENTS 2,599,450 A * 6/1952 Henning .................. 60/466
3,999,387 A * 12/1976 Knopf .................... 60/444
4,116,292 A * 9/1978 Todeschini et al. ........ 180/6.48
6,637,529 B2 * 10/2003 Suzuki et al. ............. 180/6.7
2003/0136591 A1 7/2003 Kitasaka et al.

FOREIGN PATENT DOCUMENTS

| EP | 982170 A1 | 3/2000 | |
| EP | 1327549 A1 * | 7/2003 | ........ B60K/17/06 |
| JP | 7-96855 | 4/1995 | |
| JP | 9-76931 | 3/1997 | |
| JP | 2000-16100 | 1/2000 | |
| JP | 2000-198461 | 7/2000 | |
| JP | 2001-171546 | 6/2001 | |

* cited by examiner

Primary Examiner—Lesley D. Morris
Assistant Examiner—Paul Royal, Jr.
(74) Attorney, Agent, or Firm—Jordan and Hamburg LLP

(57) ABSTRACT

A tractor having right and left traveling crawlers (9) installed thereon, comprising a hydraulic transmission swing mechanism (45), a forced-diff (41) for driving a crawler driving sprocket (4), and an engine (10), a hydraulic transmission straight-ahead driving mechanism (25), and a transmission case (12) disposed from the front side to the rear side of a machine body in that order, wherein an allowance for heat radiation is provided to a space under a machine floor for storing the hydraulic transmission straight-ahead driving mechanism (25) to eliminate the problem of the machine floor becoming too high, and the forced-diff (41) is driven by the hydraulic transmission swing mechanism (45) with a simple structure.

3 Claims, 19 Drawing Sheets

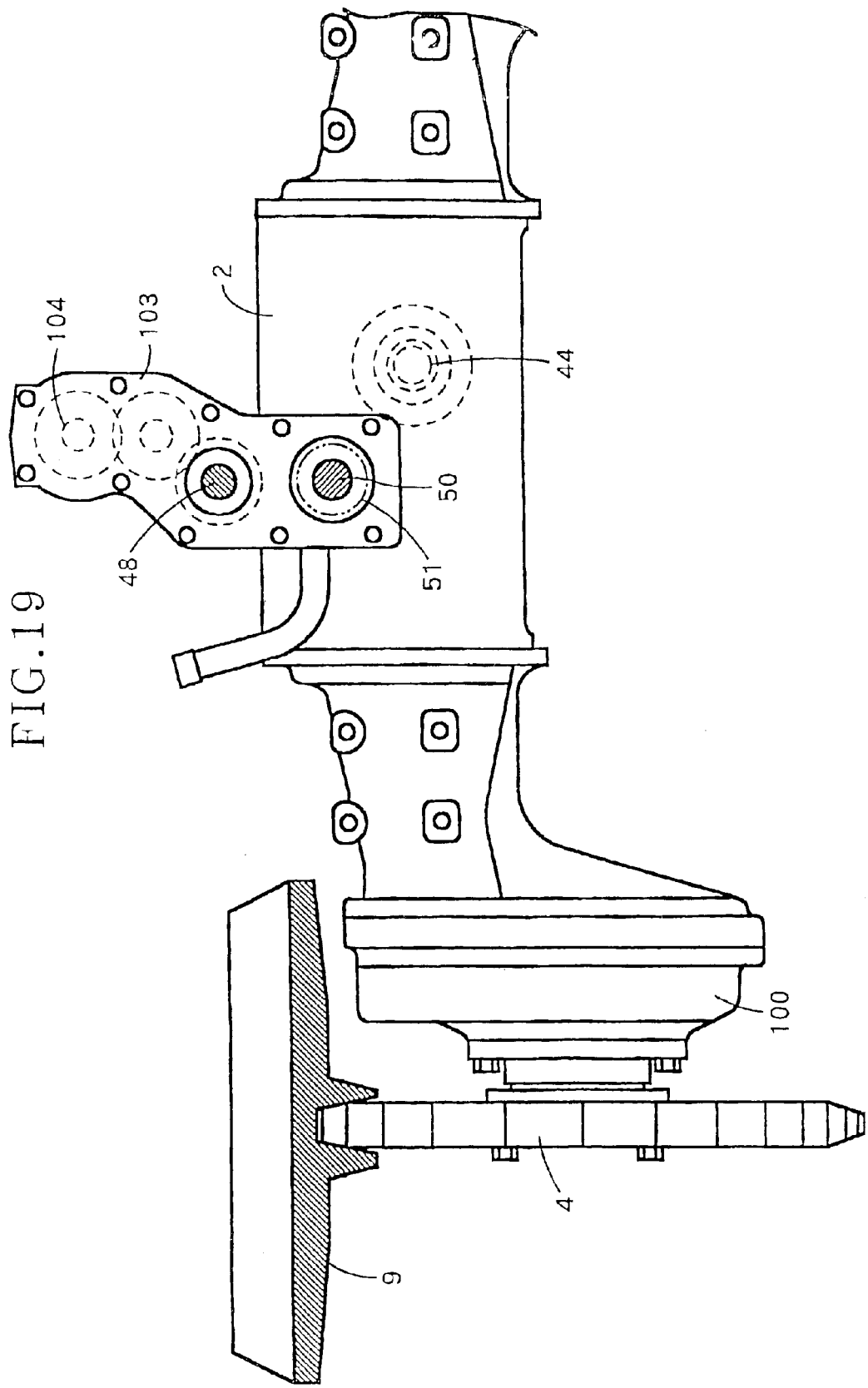

TRACTOR

FIELD OF THE INVENTION

The present invention relates to a tractor for performing agricultural or construction work by attaching an agricultural or construction work machine.

BACKGROUND OF THE INVENTION

In the prior art, a structure equipped with right and left hydraulic transmission mechanisms (HST) for driving right and left traveling crawlers individually has the problem that straight-ahead traveling performance cannot be easily improved. Another structure equipped with a hydraulic transmission straight-ahead driving mechanism for driving the right and left traveling crawlers by operating a straight-ahead transmission lever and a hydraulic transmission swing mechanism for driving the right and left traveling crawlers by operating a steering wheel in order to transmit driving force of said straight-ahead driving mechanism and said swing mechanism to the right and left traveling crawlers through a forced-diff has the problem that, although the straight-ahead traveling performance can be easily improved by driving the right and left traveling crawlers with the straight-ahead driving mechanism, when both the hydraulic transmission swing mechanism and the hydraulic transmission straight-ahead driving mechanism are stored in a space under a machine floor, the machine floor becomes too high to provide space under the machine floor with an allowance for heat radiation. Another problem is that the forced-diff driven by the hydraulic transmission swing mechanism tends to become complicated, and installation of the swing mechanism with a heavy weight, or the forced-diff mechanism with a heavy weight, tends to result in an improper shift of the machine weight. Such additional problems of the crawler type traveling mechanism cannot be easily constructed using components of a wheel type traveling mechanism, the installation position of the swing mechanism is restricted, or a change in ground contact length of the traveling crawlers tends to result in a change in swing resistance.

SUMMARIZED DISCLOSURE OF THE INVENTION

This invention relates to a tractor having right and left traveling crawlers 9 installed thereon, comprising a hydraulic transmission swing mechanism 45, a forced-diff 41 for driving a crawler driving sprocket 4, an engine 10, a hydraulic transmission straight-ahead driving mechanism 25, and a transmission case 12 disposed from the front side to the rear side of a machine body in that order, and further comprising a hydraulic transmission swing mechanism 45 disposed in the front side, wherein an allowance for heat radiation is provided to the space under the machine floor for storing the hydraulic transmission straight-ahead driving mechanism 25 to eliminate the problem where the machine floor becomes too high, and the forced-diff 41 is driven by the hydraulic transmission swing mechanism 45 with a simple structure.

In a tractor having the hydraulic transmission straight-ahead driving mechanism 25 for driving the right and left traveling crawlers 9 by operating a straight-ahead transmission lever 22 and the hydraulic transmission swing mechanism 45 for driving the right and left traveling crawlers 9 by operating a steering wheel 20, wherein the driving force of said straight-ahead driving mechanism 25 and said swing mechanism 45 is transmitted to the right and left traveling crawlers 9 through the forced-diff 41, said swing mechanism 45 and said forced-diff mechanism 41 are disposed of in the front lower side of the engine 10. Therefore good longitudinal balance of the machine weight can be obtained by installing the swing mechanism 45 and the forced-diff mechanism 41 both with the heavy weight in the front lower side of the engine 10 in a machine structure having the straight-ahead driving mechanism 25 with a heavy weight and the transmission case 12 in the rear side of the engine 10. A tilling work machine can be stably attached to the rear side of the machine body, and the difference in the ground contact pressure between the front side and the rear side of the traveling crawlers 9 can be reduced to easily improve traveling performance.

The straight-ahead driving mechanism 25 and the transmission case 12 are installed on the rear section of the engine 10 to allow the straight-ahead driving force of the transmission case 12 to enter the forced-diff 41 from the rear side. Thus the forced-diff mechanism 41 can be easily mounted using front wheel driving parts that constitute a wheel type traveling mechanism. Reduction of manufacturing costs can be easily achieved by commonly using the wheel type parts, and the installation location can be easily changed by installing the swing mechanism 45 and the forced-diff mechanism 41 independently from the straight-ahead mechanism 25 and the transmission case 12 in order to reduce limitation of a mounting position of the swing mechanism 45 and the forced-diff mechanism 41.

The driving sprockets 4 and track rollers 7 for transmitting traveling force to the traveling crawlers 9 are disposed so that the floor exit angle "A" of the traveling crawlers 9 becomes approximately 30 degrees or less. Thus the ground contact length of the traveling crawlers 9 is determined by the mounting position of the track rollers 7. The mounting position of the driving sprockets can be changed longitudinally while keeping swing resistance almost constant. Effective ground contact length of the traveling crawlers 9 is increased to easily secure traveling force on soft traveling surfaces that are often penetrated, and the swing resistance of the traveling crawlers 9 can be reduced to easily improve mobility on hard surfaces that are rarely penetrated.

The transmission case 12 is installed on the rear section of the engine 10 through the hydraulic transmission straight-ahead driving mechanism 25. A drive shaft 43 for transmitting straight-ahead driving force to the traveling crawlers 9 is extended forward from the transmission case 12. The forced-diff mechanism 41 is installed in the forward lower section of the engine 10. The hydraulic swing mechanism 45 for transmitting output power of the engine 10 from the front side is installed in front of the forced-diff mechanism 41, and the said drive shaft 43 is connected to the rear side of the forced-diff mechanism 41 from the rear side. The driving force of said swing mechanism 45 is allowed to enter from the front side of the forced-diff mechanism 41, and the right and left cases 100 are installed to both sides of the forced-diff mechanism 41 to allow the driving sprockets 4 for the right and left crawlers 9 to be installed. Thus the longitudinal balance of the machine body can be easily improved because weight of heavy components installed on the machine body is distributed longitudinally. Simplification and manufacturing cost reduction of a drive structure of the traveling crawlers 9 can be easily accomplished by installing the swing mechanism 45 and the forced-diff mechanism 41 independently, so that traveling performance and workability on farmland using the traveling crawlers 9 can be easily improved.

The drive shaft 43 is arranged in a direction slanting horizontally from the longitudinal centerline of the machine body. Therefore the input position of the travel driving shaft 43 at the rear side of the forced-diff mechanism 41 is shifted laterally. The longitudinal width of a casing 2 of the forced-diff mechanism 41 on which the front side of the swing mechanism 45 is installed in the machine body center position can be reduced, and simplification and size reduction of the structure of the forced-diff mechanism 41 can be easily achieved by effectively utilizing the lateral direction which reduces the restrictions on the dimensions.

BRIEF DESCRIPTION OF THE DRAWINGS

FIG. 19 is an explanatory partial front view of the same.

THE BEST MODES EMBODYING THE INVENTION

Figure 1:
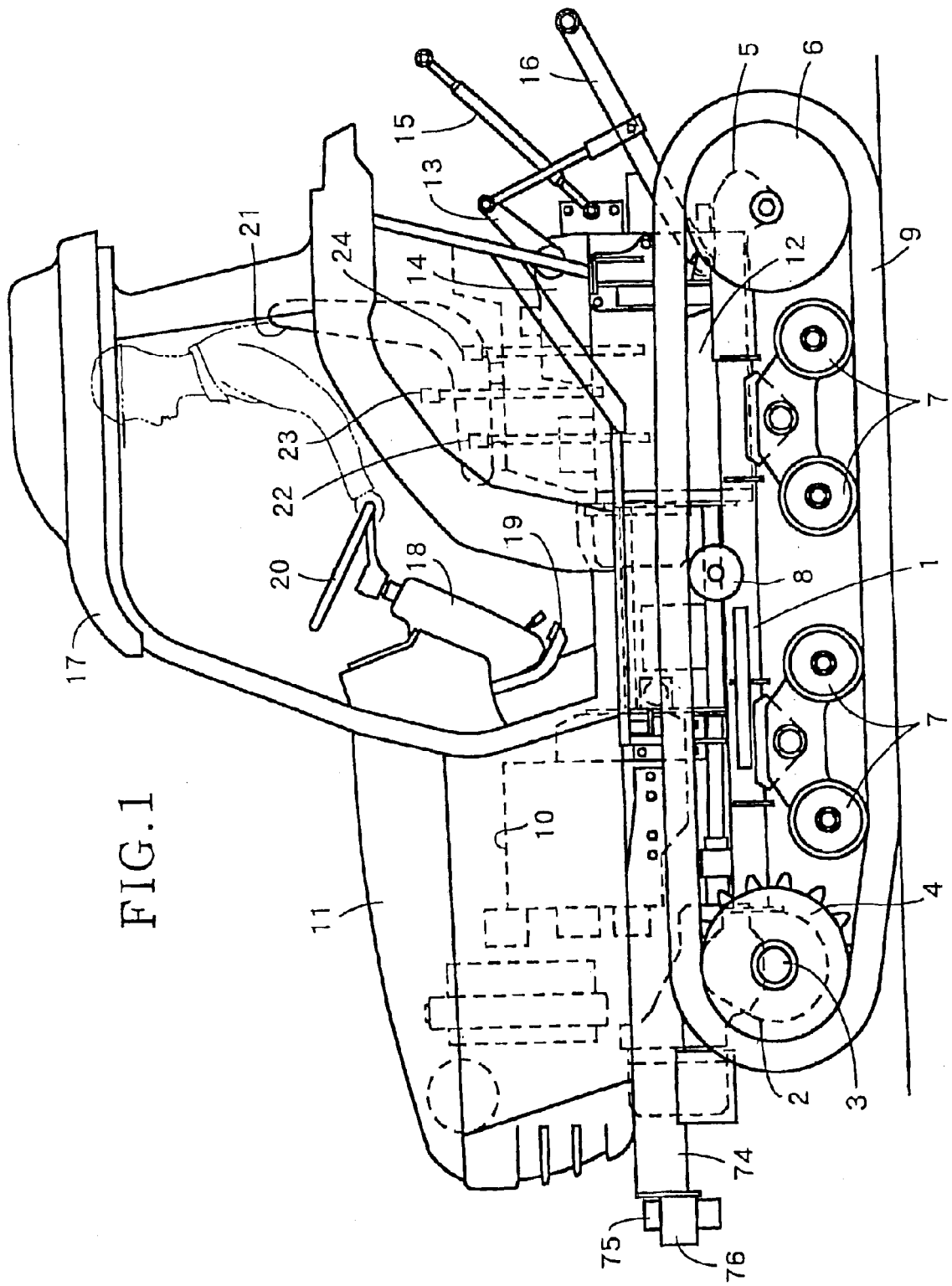
FIG. 1 is a side view of the tractor shown in its entirety.
Figure 2:
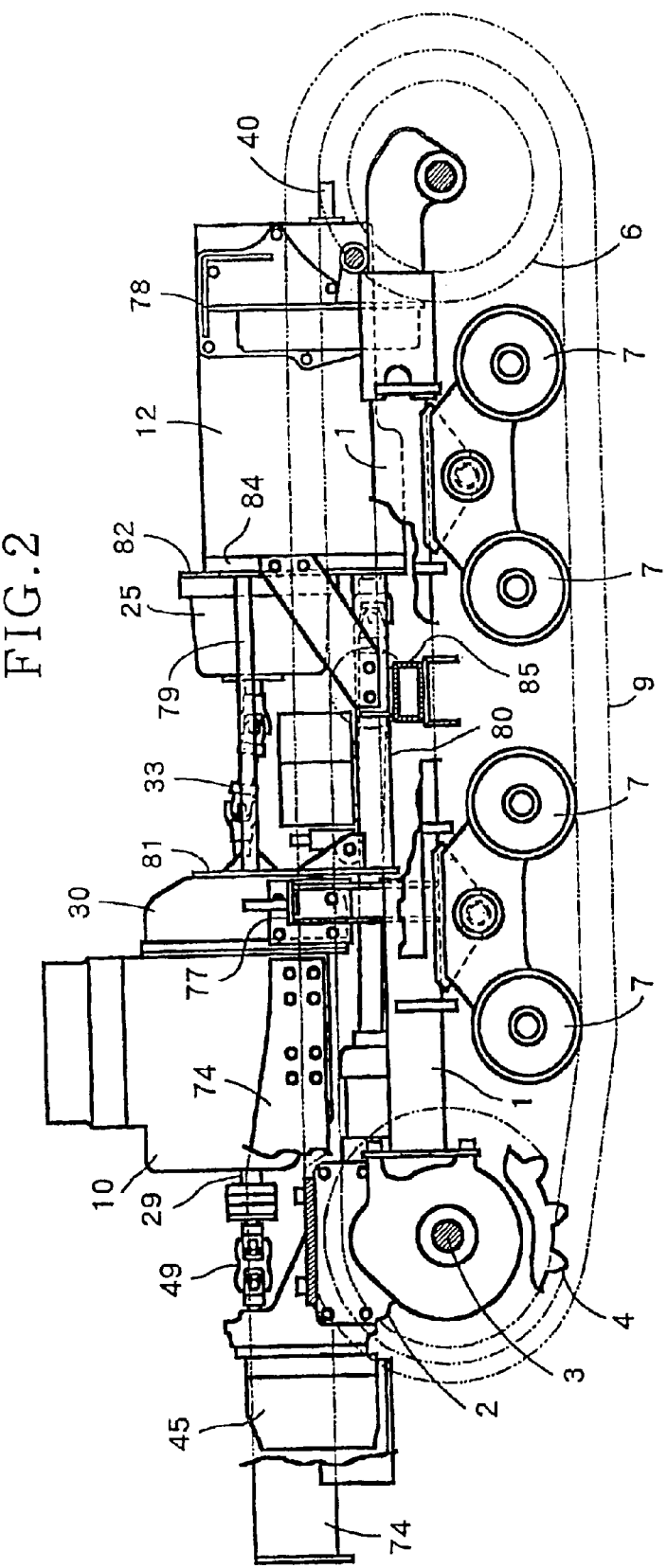
FIG. 2 is a side view for explaining the machine structure.
Figure 3:
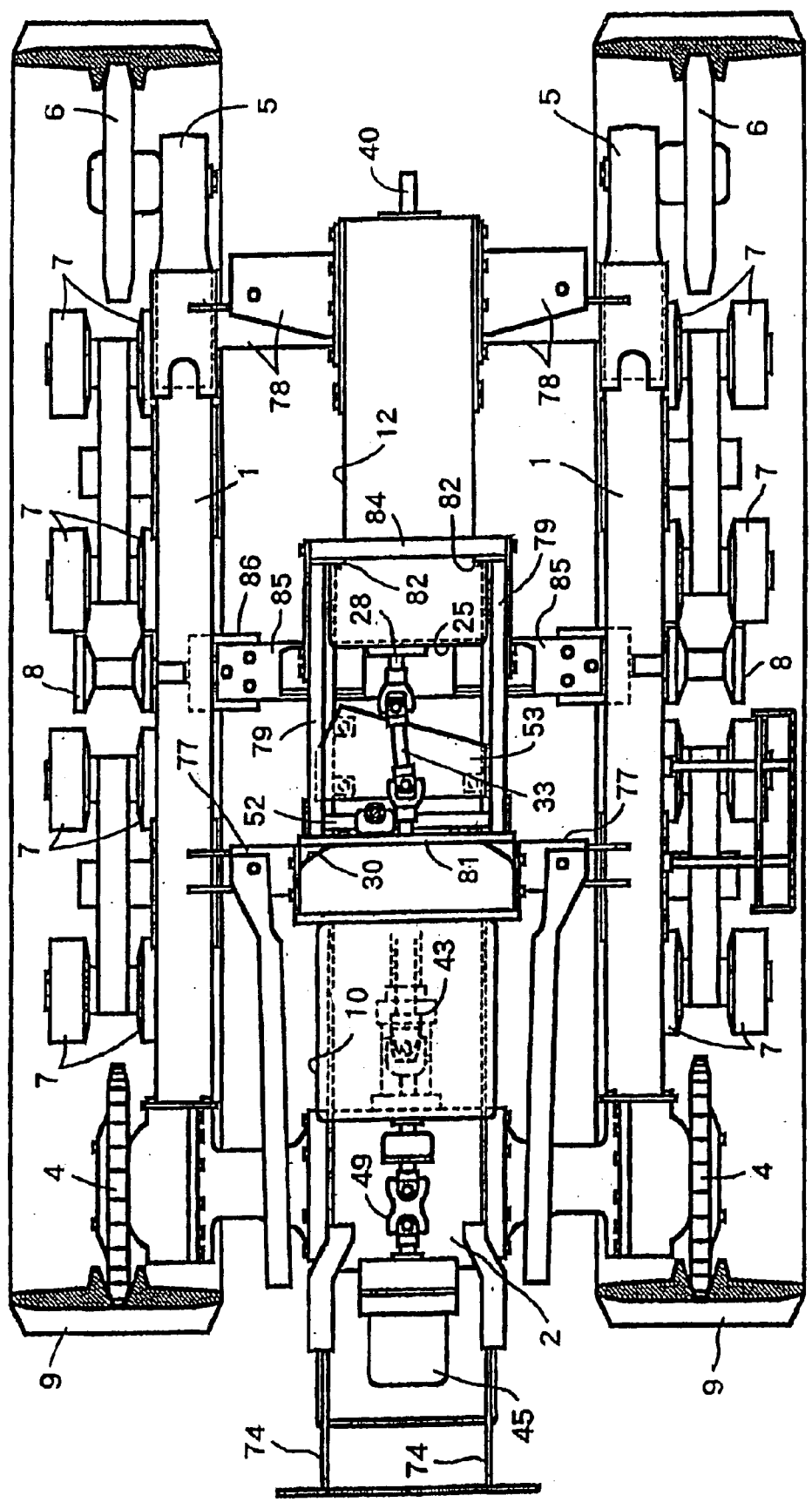
FIG. 3 is a plain view for explaining the same.

Now some embodiments of the present invention will be described with reference to the drawings. FIG. 1 is an outline side view of the tractor, FIG. 2 is a side view of an important section, and FIG. 3 is the plain view of the same. In this tractor, a front transmission case 2 is fixed to the front section of the pair of right and left crawler frames 1 with a square cylindrical shape. The right and left driving sprockets 4 are supported by right and left axles 3 of the front transmission case 2, and the rear section of said crawler frames 1 is equipped with tension rollers 6 through tension frames 5. The traveling crawlers 9 are wound between the drive sprockets 4, the tension rollers 6 through track rollers 7 and idlers 8, and a pair of the right and left traveling crawlers 9 are installed.

The engine 10 is mounted on the front upper section between the right and left crawler frames 1. The exterior of the engine 10 is covered by the bonnet 11, and the rear transmission case 12 is installed in the rear section between the right and left crawler frames 1. The hydraulic elevation cylinders 14 equipped with lift arms 13, a top link 15, and a lower link 16 are installed in the rear transmission case 12, and an agricultural work machine, such as a rotary tilling work machine or a plow, is attached to links 15 and 16 in a manner permitting elevation and removal to allow for tilling work and the like on farmland.

The cabin 17 is installed on top of the rear transmission case 12 on the rear side of bonnet 11. The handle column 18 and brake pedal 19 are installed in the front section inside cabin 17. The round type steering wheel 20 is installed to the handle column 18 and is capable of tilting and rotating. The driver's seat 21 is installed at the rear section inside cabin 17. The main and auxiliary travel transmission levers, 22 and 23, and the PTO transmission lever 24 are installed on the side of the driver's seat 21.

Figure 4:
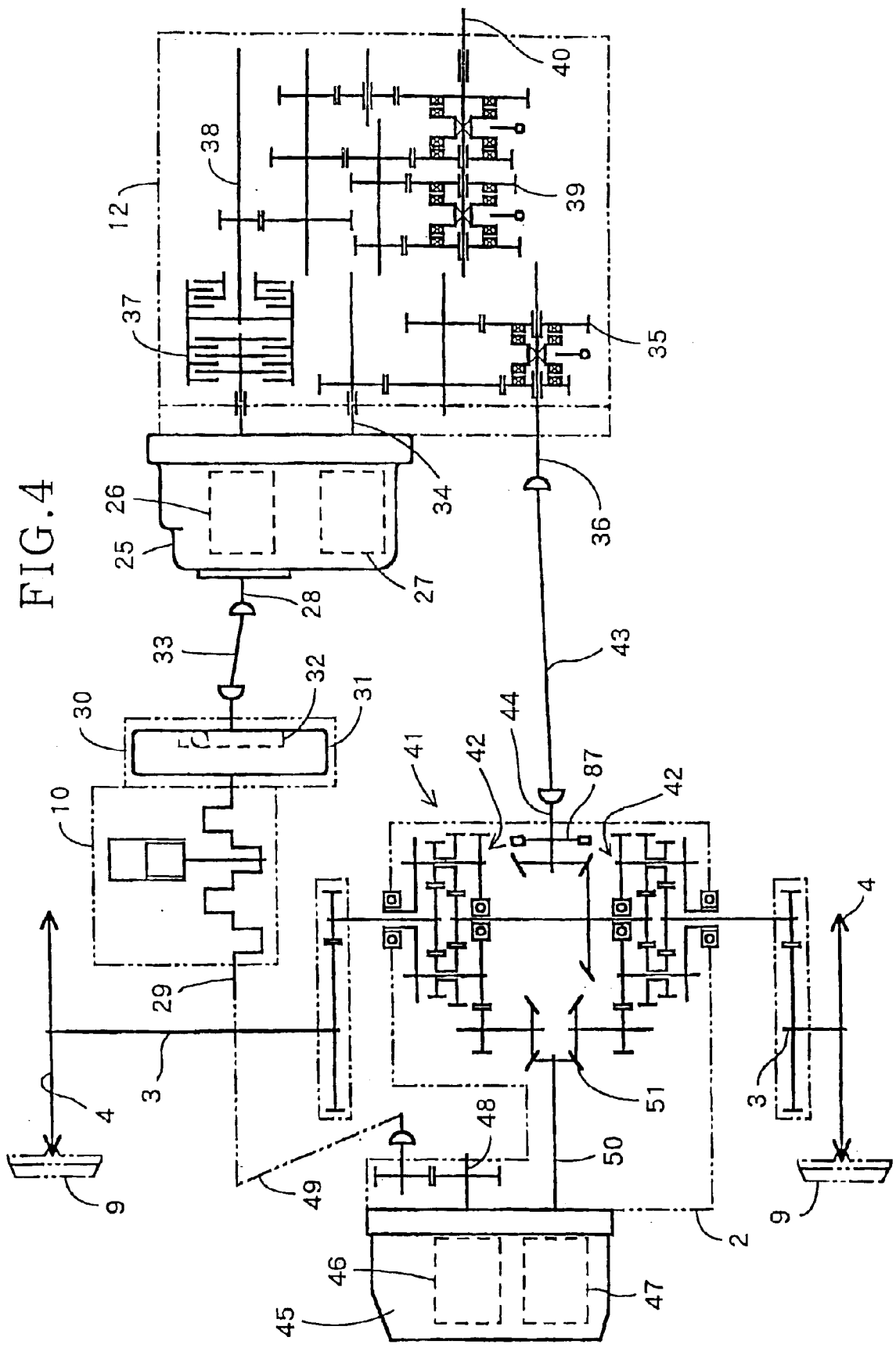
FIG. 4 is a diagram for explaining the drive.

As shown in FIG. 2 through FIG. 4, the front section of the rear transmission case 12 is equipped with hydraulic transmission case 25. The hydraulic transmission pump 26 for a hydraulic non-stage transmission structure (HST) and the motor 27 are installed inside the case 25. The pump shaft 28 for driving the pump 26 and the output shaft 29 from the engine 10 are connected through the flywheel 31 inside the flywheel case 30 at the rear of the engine 10 to the damper 32 and universal joint shaft 33. The travel transmission output shaft 36 is connected to the motor shaft 34 rotated by the motor 27 through the gear transmission mechanism 35 for auxiliary transmissions, and the output shaft 36 protrudes from the rear transmission case 12 in a forward direction. In addition, a PTO input shaft 38 is connected to the pump shaft 28 through a PTO clutch 37. The PTO input shaft 38 is installed almost coaxially with the pump shaft 28. The PTO output shaft 40 is connected to the input shaft 38 through the gear transmission mechanism 39 for PTO transmission, and the output shaft 40 protrudes from the rear transmission case 12 in a backward direction to transmit power to the agricultural machine attached to the rear section of the machine body.

Right and left planetary gear mechanisms 42 forming the forced-diff 41 are installed inside the front transmission case 2. The travel transmission output shaft 36 is connected to the right and left planetary gear mechanisms 42 through a universal joint shaft 43 and a differential input shaft 44 to transmit the transmission output of the output shaft 36 to the right and left axles 3 through the right and left planetary gear mechanisms 42 to drive the right and left traveling crawlers 9 at almost the same speed in the same direction to allow forward or backward travel. The hydraulic steering case 45 is fixed on the front face of the front transmission case 2. The hydraulic steering pump 46 and motor 47 of the hydraulic non-stage transmission structure (HST) is installed inside the case 45, and the output shaft 29 of the engine 10 is connected to the pump shaft 48 for driving the pump 46 through the universal joint shaft 49. The motor shaft 50 rotated by the motor 47 is connected to the right and left planetary gear mechanisms 42 through the right and left reverse bevel gears 51 to transmit steering output subjected to the non-stage transmission by the pump 46 and the motor 47 to the right and left axles 3 through the right and left planetary gear mechanisms 42 to drive the right and left traveling crawlers 9 at almost the same speed in the reverse direction to allow travel and turning to the right or the left.

As clarified above, in a tractor with the right and left traveling crawlers 9, the hydraulic case 45 serving as a hydraulic transmission swing mechanism, the forced-diff 41 driving the crawler drive sprockets 4, the engine 10 and the hydraulic transmission case 25 serving as the hydraulic transmission straight-ahead drive mechanism, and the transmission case 12 are disposed from the front side to the rear side of the machine body in that order. The hydraulic steering case 45 is installed in the front section to provide allowance for heat radiation to the space under the machine floor for storing the hydraulic transmission straight-ahead driving mechanism 25 to eliminate the problem of the machine floor becoming too high and to allow the forced-diff 41 to be driven by the hydraulic steering case 45 with a simple structure.

Figure 5:
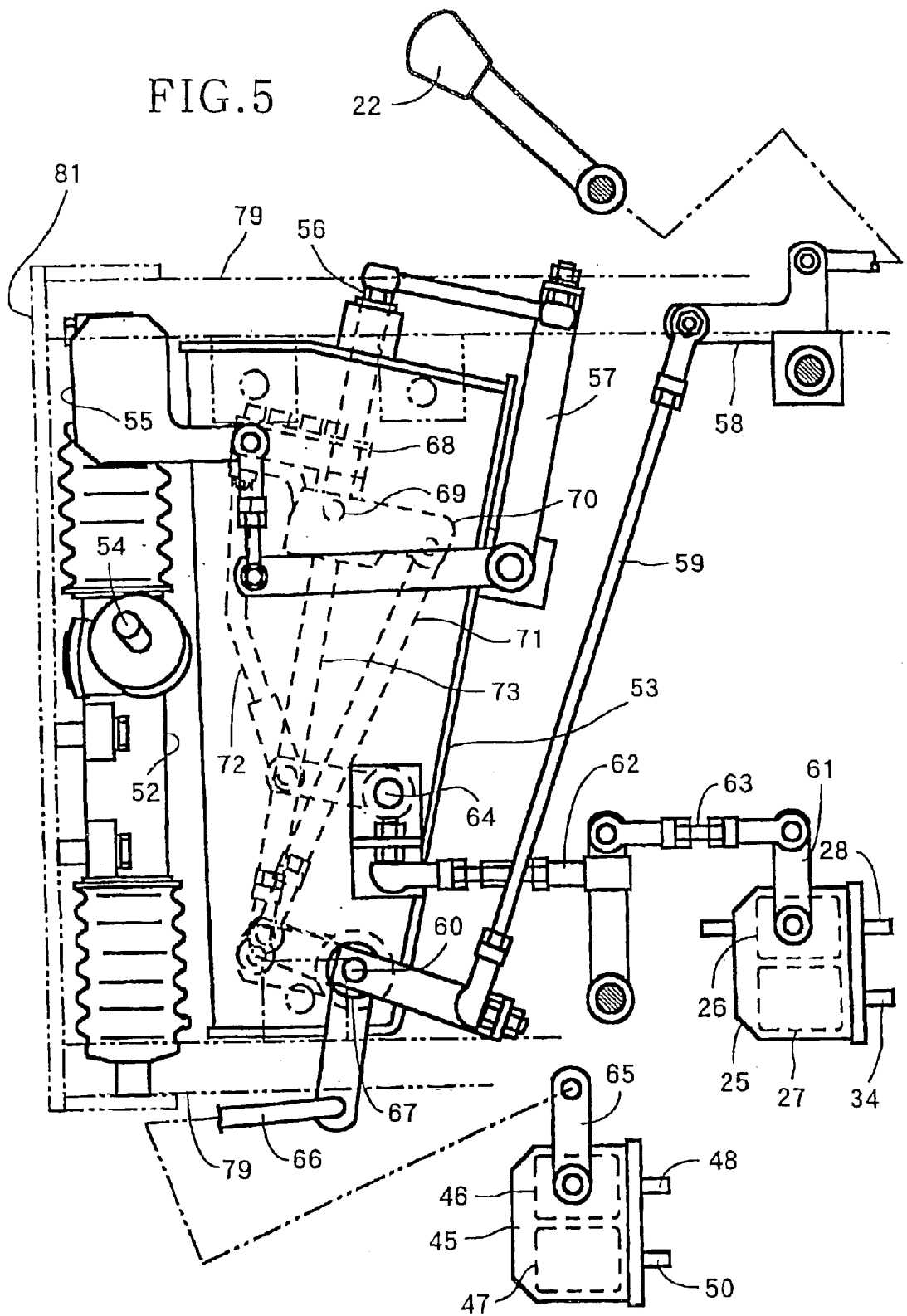
FIG. 5 is a diagram for explaining the steering and travel transmission operation.
Figure 6:
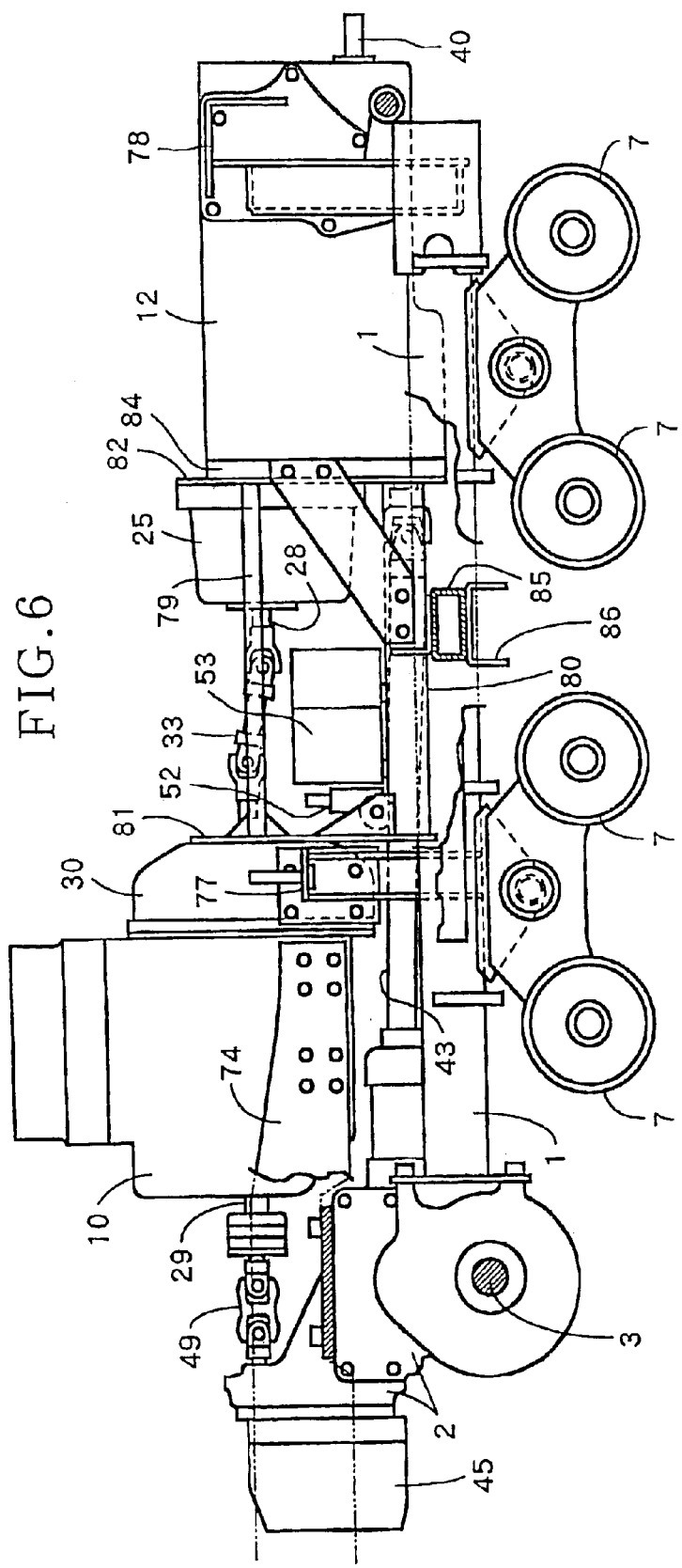
FIG. 6 is an enlargement view of FIG. 2.
Figure 7:
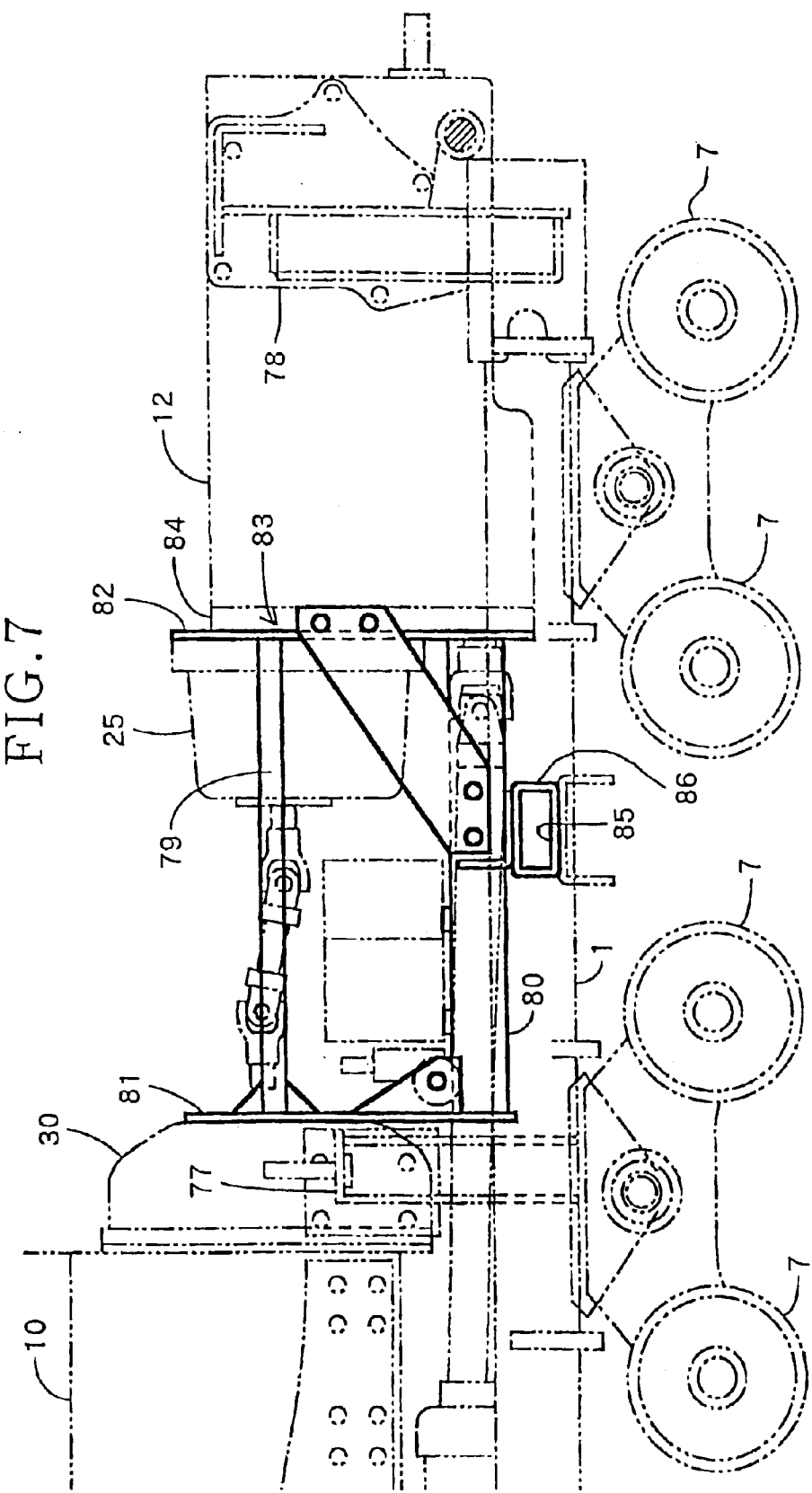
FIG. 7 is a side view of the frame section.
Figure 8:
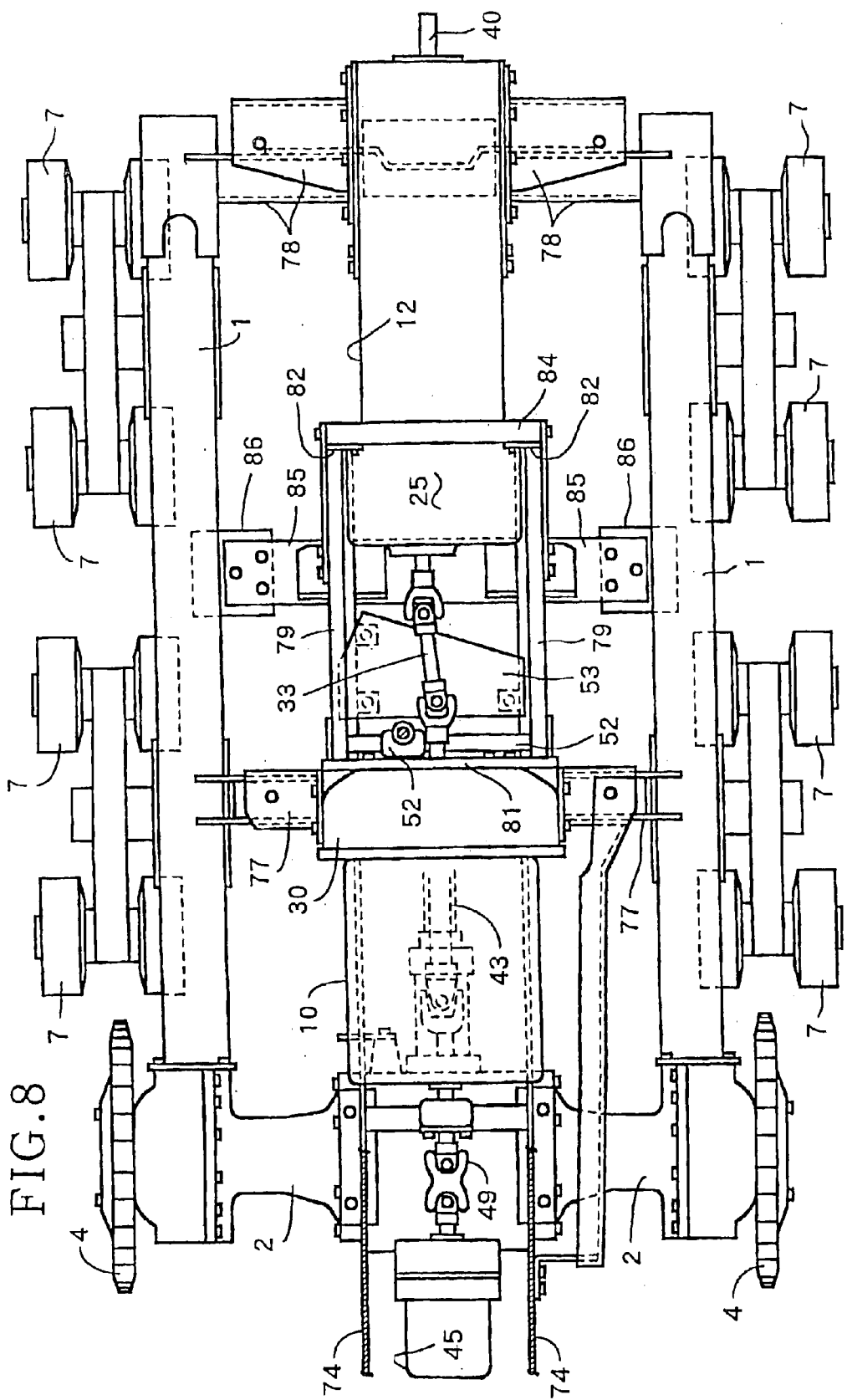
FIG. 8 is an enlargement view of FIG. 3.

As shown in FIG. 5, the rack case 52 for steering operation output and the steering and travel transmission operation case 53 of a tightly closed box type are installed. The steering wheel 20 is connected to the pinion rotating shaft 54 of the rack case 52, and the rack moving plate 55 of the rack case 52 is connected to the steering operation shaft 56 at the right side of the operation case 53 through the crank arm 57. The transmission operation input shaft 60 is connected to the main transmission lever 22 through the link 58, and the rod 59. The transmission operation output shaft 64 is connected through the arm 61, and rods 62 and 63 for pump output non-stage transmission of the transmission case 25. The steering operation output shaft 67 is connected to the arm 65 for pump output non-stage transmission of the steering case 45 through the rod 66 and is supported by the operation case 53 in a rotatable manner. In addition, the transmission operation input shaft 60 and the steering operation output shaft 67 are coaxially installed in a rotatable manner, and each of shafts 60, 64 and 67 is protruded from the top of the case 53 and connected to the lever 22 or the arms 61 and 65.

The connecting member 68 rotated around the shaft center by the steering operation shaft 56, the oscillating member 70 rotating the connecting member 68 around the fulcrum shaft 69 from which the shaft center intersects the operation shaft 56 almost perpendicularly, the transmission operation input rod 71 connecting the oscillating member 70 to the transmission operation input shaft 60, the transmission operation output rod 72 connecting the connecting member 68 to the transmission operation output shaft 64, and the steering operation output rod 73 connecting the connecting member 68 to the steering operation output shaft 67 are installed inside the operation case 53. The rod 73 is connected to the connecting member 68 coaxially with the fulcrum shaft 69 in a universal joint manner. The transmission operation output rod 72 is connected to the connecting member 68 in a universal joint manner in such a way that the connecting point of the transmission operation output rod 72 is 90 degrees apart from the connecting point of the rod 73 on a circumference centered with the axis of the steering operation shaft 56, and the output shaft 64 and the rod 72 Also, the output shaft 67 and the rod 73 are connected respectively in different positions on the shaft centerline of the steering operation shaft 56.

As described above, the forced-diff 41 equipped with the right and left planetary gear mechanisms 42 is installed inside the front transmission case 2 to drive the right and left traveling crawlers 9. The straight-ahead traveling force is transmitted to the forced-diff 41 through the travel non-stage transmission pump 26 and the motor 27 to drive the right and left traveling crawlers 9 at the same speed in the same direction. On the other hand, swing travel force is transmitted to the forced-diff 41 through the hydraulic steering pump 46 for swing and the motor 47 to drive the right and left traveling crawlers 9 at the same speed in the reverse direction. Thus outputs of both the travel non-stage transmission pump 26 and the motor 27, and both the steering pump 46 for swing and the motor 47 are adjusted by the steering wheel 20. The travel speed is reduced in response to degree of operation of the steering wheel 20, and the speed difference of the right and left traveling crawlers 9 is continuously changed to shift to a spin-turn action. In a condition where the main transmission lever 22 for operating the output of the travel non-stage transmission pump 26 for transmitting straight-ahead driving force and where the motor 27 is in a neutral position, the swing output by the steering wheel 20 is kept in the OFF condition. When the main transmission lever 22 is operated to a position other than neutral, the swing output of the steering wheel 20 is changed in proportion to the travel transmission. Thus, when the steering wheel 20 is in a straight-ahead position, only the travel non-stage transmission pump 26 for transmitting straight-ahead driving force and the motor 27 are allowed to perform forward and backward output actions in linkage with the inclination of the main transmission lever 22. Adjustment of outputs of the steering pump 46 and the motor 47 by the main transmission lever 22 is stopped. When the steering wheel 20 is in a position other than straight-ahead position, adjustment of both travel transmission and the swing output is performed by operating the main transmission lever 22. On the other hand, both swing output adjustment and travel transmission are performed by operating the steering wheel 20 where the main transmission lever 22 is in a position other than neutral.

As shown in FIGS. 2 and 3 and FIG. 6 through FIG. 10, right and left engine frames 74 are fixed to the lower sections of both sides of the engine 10. The engine frames 74 are extended forward to fix the weight 75 and the front bumper 76 on the front section. The lower middle face of the engine frame 74 is bolted on the top of the front transmission case 2. The front cabin pedestals 77 for receiving and fixing the front lower face of the cabin 17 in a detachable manner are welded to the crawler frames 1. The right and left front cabin pedestals 77 are bolted on the right and left sides of the flywheel case 30. The rear cabin pedestals 78 for placing and fixing the rear lower face of the cabin 17 in a detachable manner are welded to the rear section of the crawler frames 1, and the right and left rear cabin pedestals 78 are bolted on the right and left sides of the rear transmission case 12.

The front and rear section of the pair of the right and left upper frames 79 and the pair of right and left lower frames 80 are welded to the front frame 81 and the rear frame 82 to form the frame 83. The front frame 81 is bolted to the rear face of the flywheel case 30 in a detachable manner. The rear frame 82 is bolted to the front plate 84 of the rear transmission case 12 in a detachable manner. The right and left upper frames 79 are installed on both sides in a longitudinally extending condition at a height almost the same as that of the pump shaft 28 and said universal joint shaft 33. The right and left lower frames 80 are installed on both sides in a longitudinally extending condition at a height almost the same as that of the travel transmission output shaft 36 and the universal joint shaft 43. The horizontal frame 85 installed in a laterally extending condition is welded to the lower face of the lower frame 80. The horizontal frame 85 is placed and bolted on receiver 86 of the right and left crawler frames 1 in a detachable manner, and the middle of longitudinal width of the lower frame 80 is connected to the crawler frames 1 through the horizontal frame 85.

As shown above, in a tractor having the traveling crawlers 9 installed in the crawler frames 1, the engine 10 and the rear transmission case 12 installed in the front and rear sections of the crawler frames 1, and the axle case 2 installed to the front section of the crawler frames 1, the frame 83 is fixed between the rear side of the engine 10 and the front side of the rear transmission case 12, and the frame 83 is connected to the crawler frames 1. Thus the weight and cost of the connecting structure between the engine 10 and the rear transmission case 12 can be reduced, deformation of the crawler frames 1 from the weight of the machine attached to the rear section of the rear transmission case 12 can be prevented by reinforcement of the frame 83. Weight reduction, production cost reduction and strength improvement of the machine structure composed by said crawler frames 1 and the frame 83 can be achieved.

The hydraulic transmission case 25 is fixed on the front face of the front plate 84 of the rear transmission case 12, and the hydraulic transmission case 25 is disposed above the travel transmission output shaft 36 between the right and left upper frames 79. The hydraulic transmission case 25 is disposed in a posture where a line connecting the centers of the pump shaft 28 and the motor shaft 34 is inclined to the right to reduce the vertical installation distance between the pump shaft 28 and the motor shaft 34 in comparison with an upright posture where the centers of shafts 28 and 34 are arranged on the same vertical line to reduce the vertical installation distance between the pump shaft 28 and the travel transmission output shaft 36, and to reduce the height of the rear transmission case 12. In addition, the output shaft 38 and the universal joint shaft 43 are arranged and protected over the top of said horizontal frame 85. Accordingly, the hydraulic transmission case 25 for transmitting output of the engine 10 to the rear transmission case 12 is installed inside the frame 83 to provide the frame 83 with a structure corresponding to the mounting of the hydraulic transmission case 25, while forming an open space sufficient for air cooling of the hydraulic transmission case 25. Therefore cooling (radiation cooling) of the hydraulic transmission case 25 can be easily accomplished, the mounting posture of the hydraulic transmission case 25 can be freely selected, the transmission function can be maintained, and simplification or size reduction of the transmission structure can be achieved. By fixing the rear section of the frame 83 and the hydraulic transmission case 25 to the front plate 84 of the rear transmission case 12, the machine body side of the rear transmission case 12 with different specifications or conventional structure can be used only by a design change of the front plate 84. Furthermore, the hydraulic transmission case 25 is installed to the frame 83 equipped with a travel transmission operation mechanism with high accuracy to reduce manufacturing costs and improve handling workability, such as assembly and disassembly.

The rack case 52 is fixed almost in parallel to the rear side of the front frame 81 of the frame 83. The steering and travel transmission operation case 53 is fixed between the right and left lower frames 80. The operation case 53 is arranged at the rear side of the rack case 52 to be installed inside the frame 83, and the rack case 52 and the operation case 53 are installed by effectively utilizing the space between the upper and lower power transmission universal joint shafts 33 and 43. The steering and travel transmission operation case 53 is installed to the frame 83. The steering and travel transmission operation case 53 is equipped with an operation mechanism for steering and the travel transmission is connected to the steering wheel 20 and the main travel transmission lever 22. Thus, the operation case 53 can be compactly stored in the frame 83 below the step of cabin 17 utilizing the space between the rear side of the engine 10 and the front side of the rear transmission case 12, the handle column 18 can be made compact, and simplification and functional improvement of the steering and travel transmission operation can be achieved by allowing steering operation to control the travel transmission and the travel transmission operation the steering control.

Figure 9:
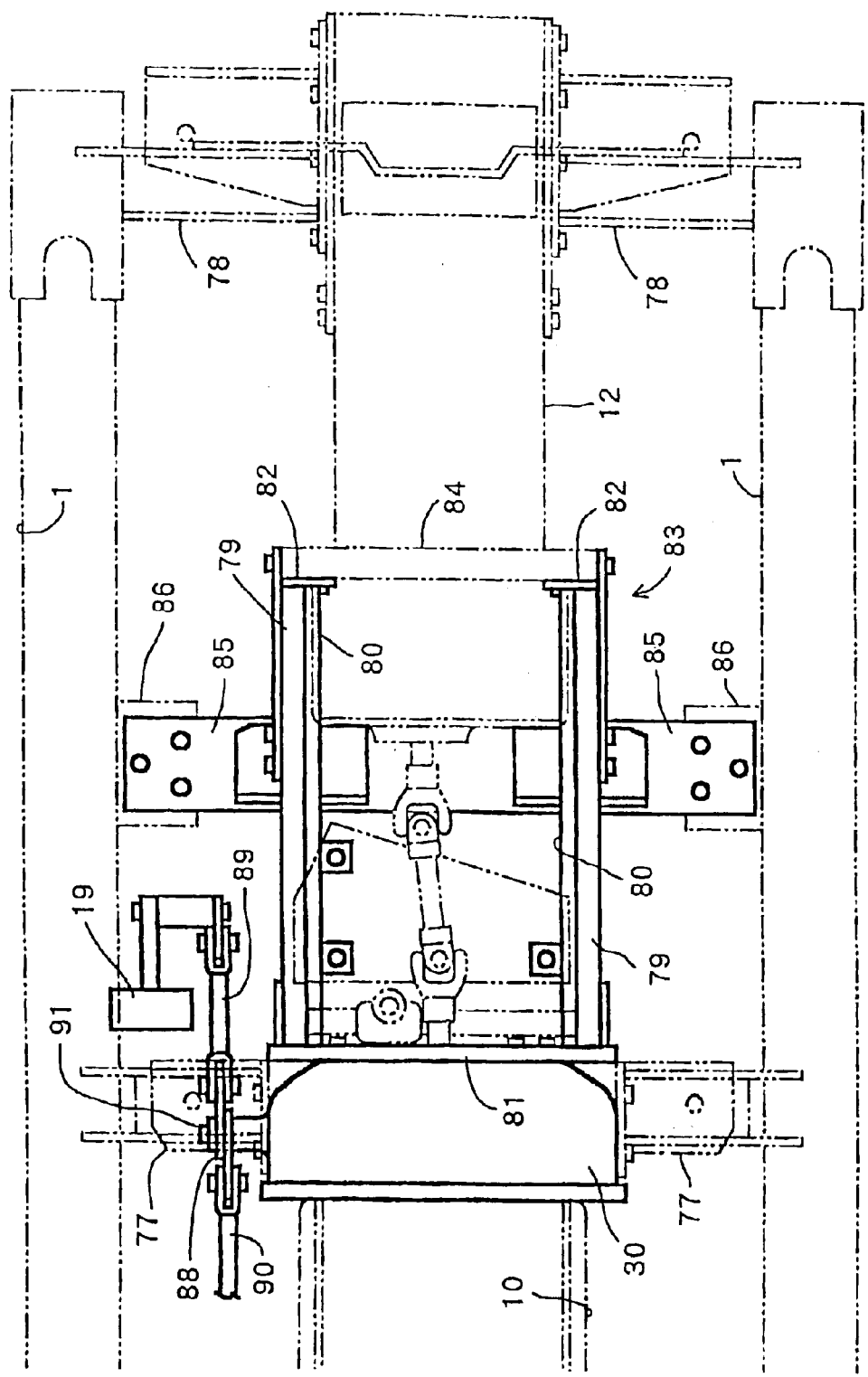
FIG. 9 is a plain view of the frame section.
Figure 10:
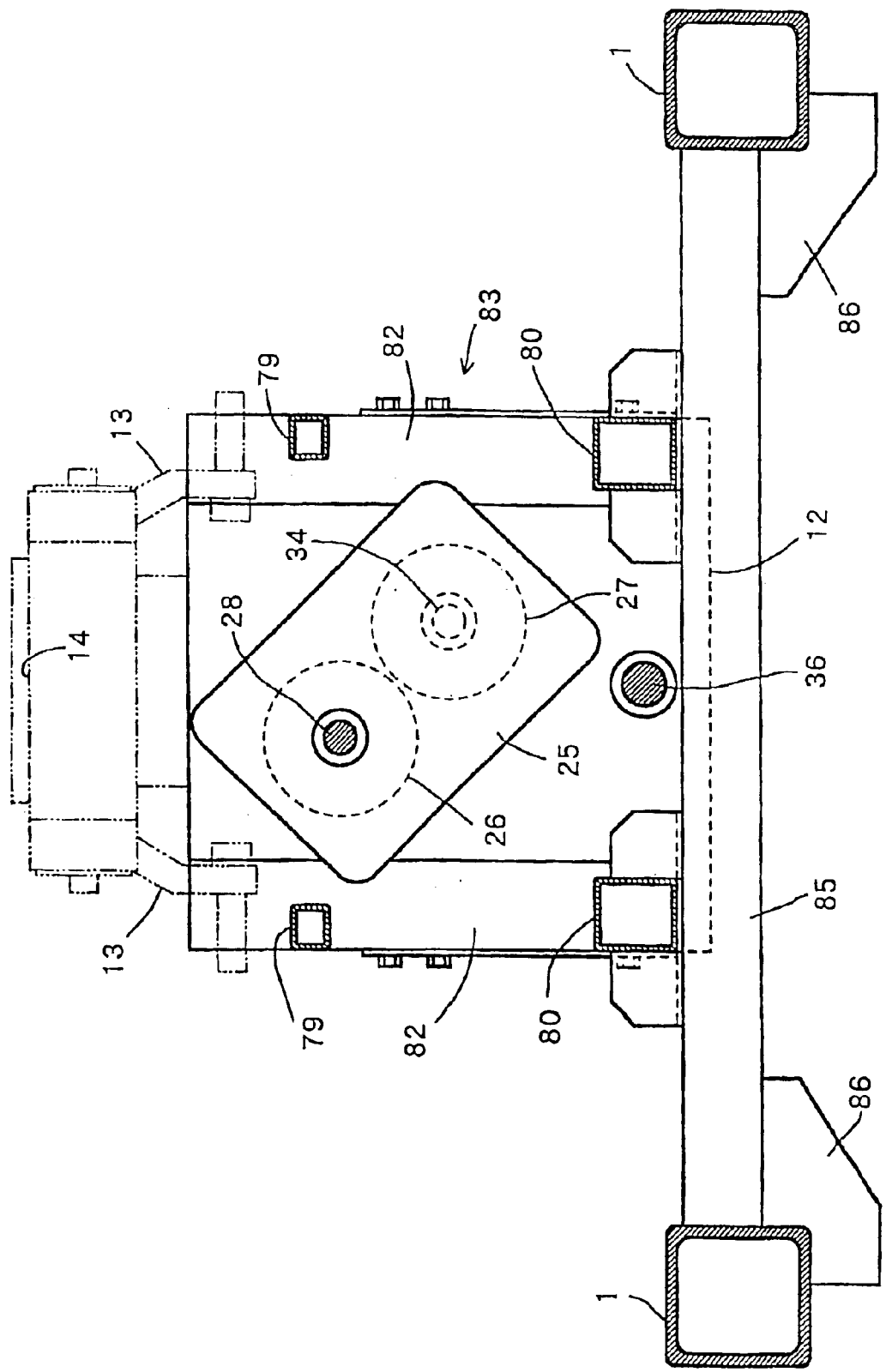
FIG. 10 is a front view of the same.

As shown in FIGS. 4 and 9, the brake pedal 19 installed in the cabin 17 and the brake 87 installed in the front transmission case 2 are connected through the brake link 88, brake rods 89 and 90. The brake link 88 is supported by the fulcrum shaft 91 fixed on the right side of the flywheel case 30 in a rotatable manner, and the brake 87 is turned on by pedaling the brake pedal 19 to brake the differential input shaft 44. The front side of the frame 83 is fixed on the rear face of the flywheel case 30 at the rear side of the engine 10. The flywheel case 30 is equipped with the fulcrum shaft 91 of a brake mechanism, the cabin mounting frame is formed on the front cabin pedestals 77 serving as connecting frames for the crawler frames 1 and the flywheel case 30. The engine 10 with different specifications and the frame 83 are connected by modifying the flywheel case 30, and the disconnection and connection of the brake pedal 19 of the cabin 17 and the brake mechanism are performed by detaching and attaching the brake link 88 and the rod 89. Thus support strength of the engine 10, the front section of the cabin 17, and the front section of the frame 83 are improved by connecting the flywheel case 30 and the crawler frames 1. Therefore, the manufacturing cost of the support section of the engine 10 can be reduced, handling workability such as assembly and disassembly of the cabin 17 can be improved, and sufficient strength of the machine body such as the crawler frames 1 and the frame 83 can be ensured.

Figure 11:
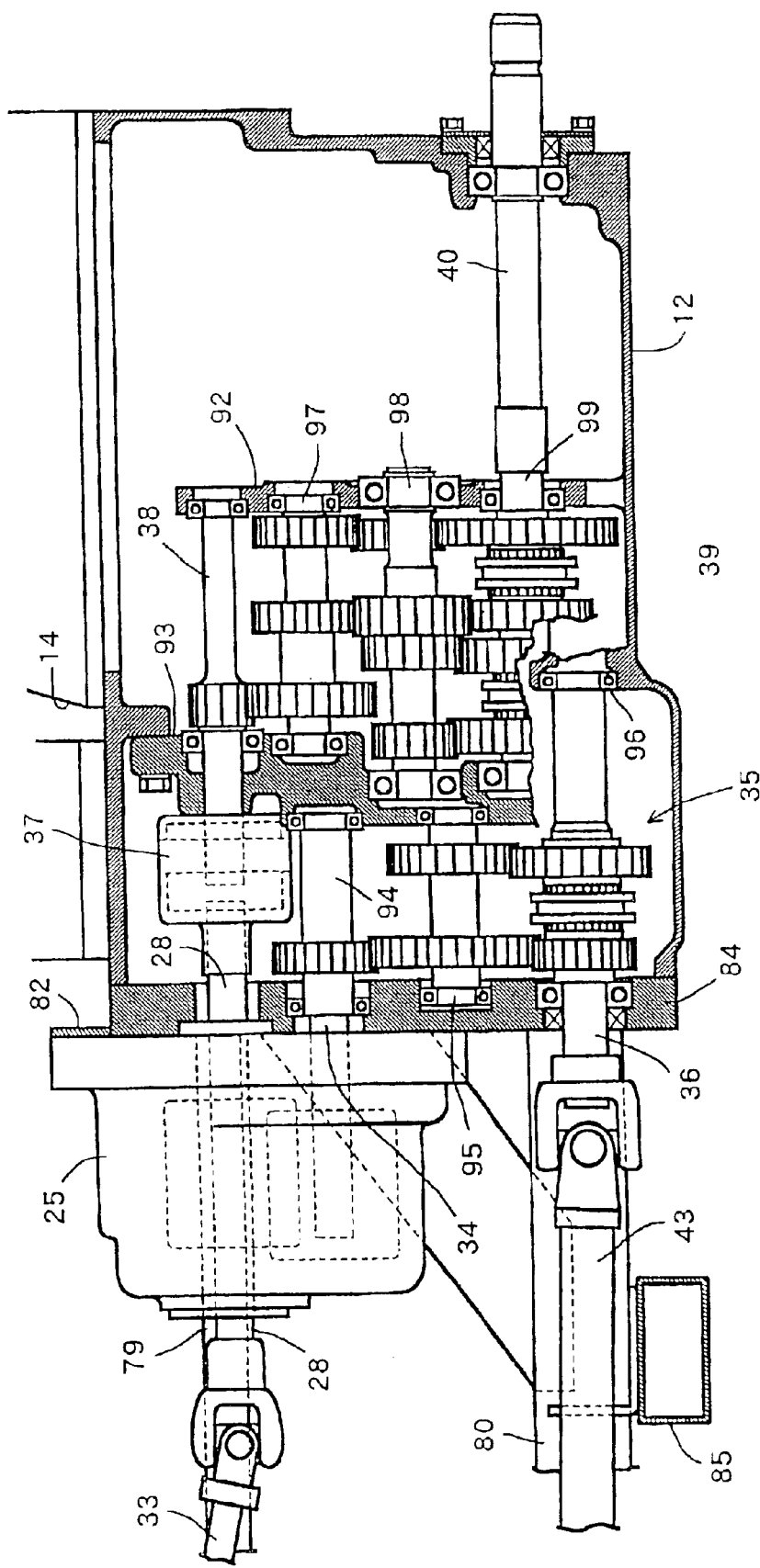
FIG. 11 is a sectional side view of the rear transmission case.
Figure 12:
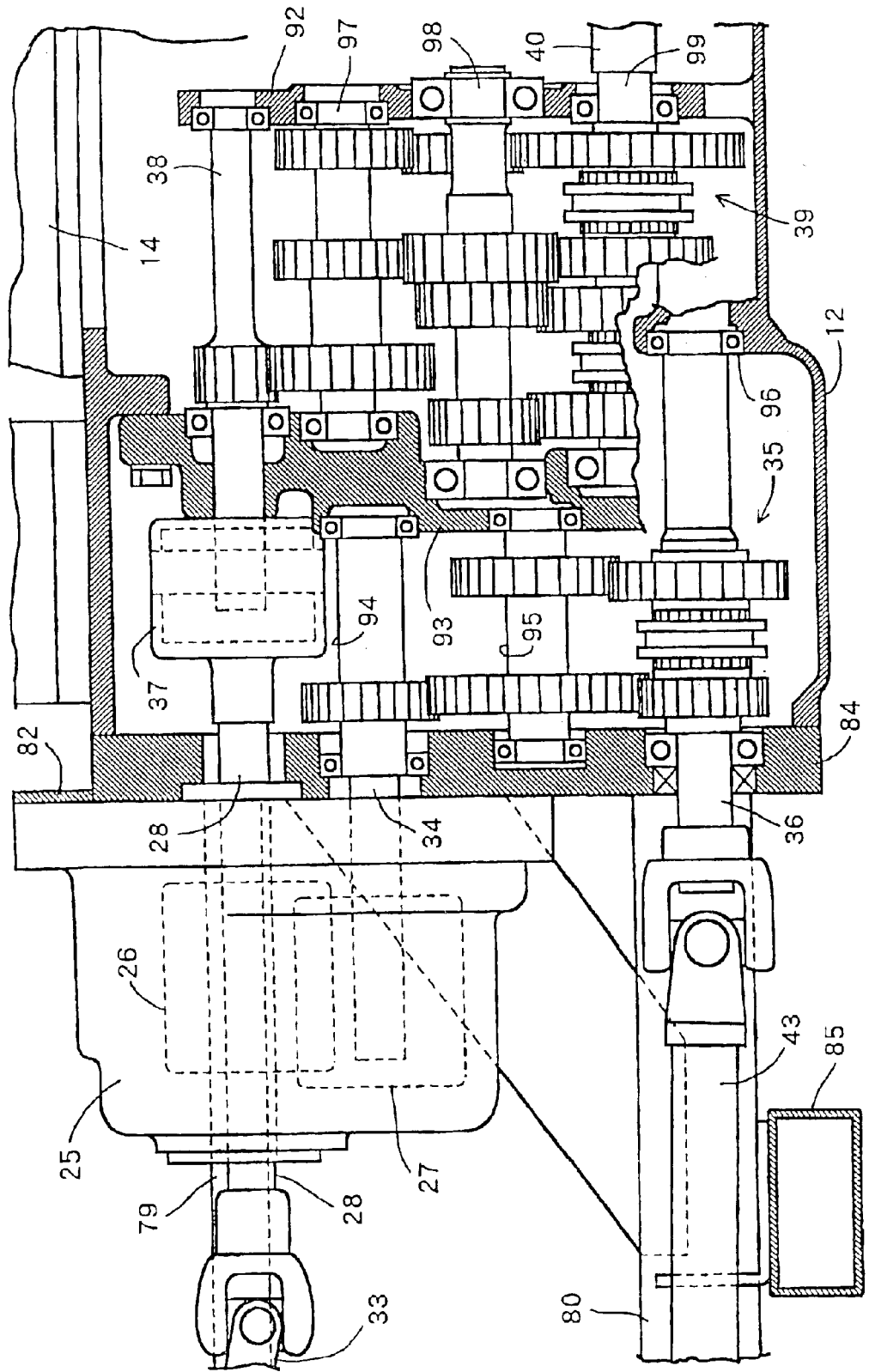
FIG. 12 is an enlargement view of the same.

As shown in FIGS. 11 and 12, the front plate 84 is bolted on the front face of the rear transmission case 12 in a detachable manner, an inner wall 92 arranged almost in parallel with the front plate 84 is integrally formed inside the rear transmission case 12 by casting, a bearing plate 93 is bolted inside the rear transmission case 12 between the front plate 84 and the inner wall 92 in a detachable manner, the bearing plate 93 is installed almost in parallel with the front plate 84, and the bearing plate 93 is formed so as to be smaller than a front opening of the rear transmission case 12 to allow the bearing plate 93 to go in and out through the front opening of the case 12 after removing the front plate 84.

An auxiliary transmission 1 shaft 94 and 2 shaft 95 installed in the gear transmission mechanism 35 for auxiliary transmission are supported by the front plate 84 and the bearing plate 93 in a rotatable manner, the travel transmission output shaft 36 is supported by the bearing 96 of the rear transmission case 12 and the front plate 84 in a rotatable manner, and the transmission mechanism 35 is disposed between the front plate 84 and the bearing plate 93 to transmit the output of the motor shaft 34 to the output shaft 36. Furthermore, the PTO input shaft 38, the PTO transmission 1 shaft 97, 2 shaft 98, and 3 shaft 99 of the gear transmission mechanism 39 for PTO transmission are supported by the inner wall 92 and the bearing plate 93 in a rotatable manner. The PTO clutch 37 connecting the PTO input shaft 38 to the pump shaft 28 is installed between the front plate 84 and the bearing plate 93 above the gear transmission mechanism 35 for auxiliary transmission, and the gear transmission mechanism 39 for PTO transmission is provided between the inner wall 92 and the bearing plate 93 to transmit output of the PTO input shaft 38 to the PTO output shaft 40 through each of shafts 97, 98 and 99.

As shown above, in a tractor having the front plate 84 fixed to the front side of the transmission case 12, the bearing plate 93 installed inside the rear transmission case 12, and the hydraulic transmission case 25 installed on the front face of the front plate 84, the PTO clutch 37 is installed in a high position of the rear transmission case 12 between the front plate 84 and the bearing plate 93, and the PTO clutch 37 is connected to the input shaft 28 of the hydraulic transmission case 25. Thus the mounting space for the PTO clutch 37 is secured above the gear transmission mechanism 35 for travel transmission, a vertical mounting space for the gear transmission mechanism 39 for PTO transmission and the PTO clutch 37 is reduced, and the height of the rear transmission case 12 is reduced to make the rear transmission case 12 compact. Therefore the bearing plate 93 can be attached and detached so that the PTO input shaft 38 serving as a PTO clutch shaft is supported by the bearing plate 93. The assembly of the gear transmission mechanism 39 for PTO transmission is completed by installing the bearing plate 93 after mounting the gear transmission mechanism 39 for PTO transmission on the rear transmission case 12, and then the gear transmission mechanism 35 for travel can be installed to the bearing plate 93 to simplify assembly procedures and facilitate disassembly work to achieve simplification, such as for assembly and disassembly of the transmission case 12.

The inner wall 92 integrally formed inside the rear transmission case 12, the front plate 84 serving as an outer wall fixed at a side of the rear transmission case 12 in a manner capable of opening and closing, and the bearing plate 93 serving as a bearing wall fixed almost in parallel between the outer wall 84 and the inner wall 92 in a detachable manner, are installed, and the gear transmission mechanisms 39 and 35 with different specifications are installed between the inner wall 92 and the bearing plate 93 and between the front plate 84 and the bearing plate 93, respectively, to improve assembly workability. The rear transmission case 12 is partitioned by the bearing plate 93. The PTO gear transmission mechanism 39 is installed inside the rear section of the rear transmission case 12, and the travel gear transmission mechanism 35 is installed inside the front section of the rear transmission case 12 for simplification and cost reduction of the machining of bearings inside the main body of the rear transmission case 12. Thus the auxiliary transmission 1 shaft 94 can be connected to the motor shaft 34 of the hydraulic transmission case 25 in the shortest distance. The travel transmission output shaft 36 can be protruded at the lower section of the front plate 84 in a forward direction, the space for installing the PTO clutch 37 can be secured above the auxiliary transmission 1 shaft 94 between the front plate 84 and the bearing plate 93, and the hydraulic transmission case 25 can be installed over the outer end of the auxiliary transmission 1 shaft 94 to reduce the distance between the centers of the pump shaft 34 and the travel transmission output shaft 36.

Figure 13:
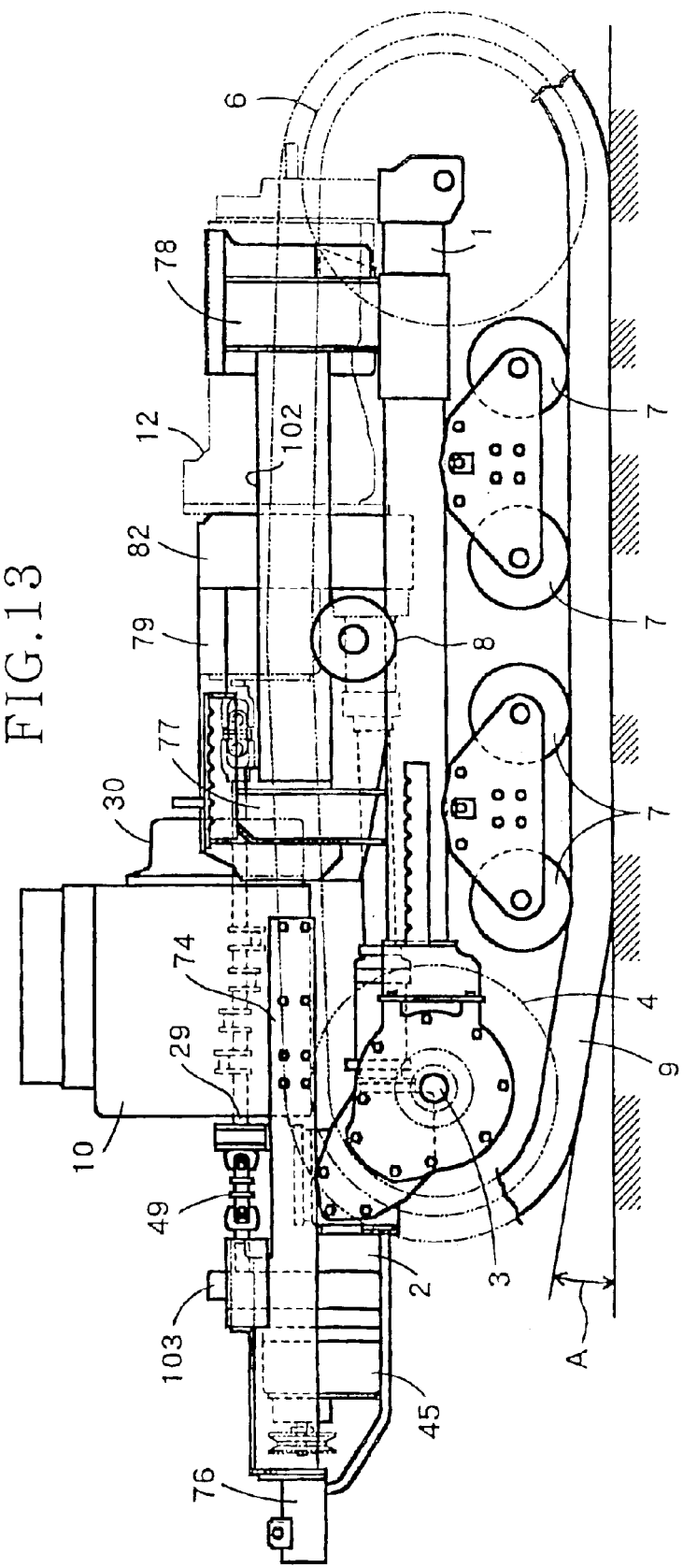
FIG. 13 is a side view showing a modification of FIG. 2.

FIG. 13 through FIG. 19 shows a modification example of the above FIG. 2. As shown in FIG. 2 or FIG. 13, in a tractor having the hydraulic transmission case 25 serving as the hydraulic transmission straight-ahead driving mechanism for driving the right and left traveling crawlers 9 by operating the main travel transmission lever 22 serving as a straight-ahead transmission lever, the hydraulic steering case 45 serving as the hydraulic transmission swing mechanism for driving the right and left traveling crawlers 9 by operating the steering wheel 20, and wherein driving force of the transmission case 25 and the steering case 45 is transmitted to the right and left traveling crawlers 9 through the forced-diff 41, the steering case 45 and the front transmission case 2 with the forced-diff 41 mechanism installed therein are disposed in the forward lower section of the engine 10, and the transmission case 25 and the rear transmission case 12 having heavy weight are installed in the rear section of the engine 10. Thus by installing the steering case 45 with a heavy weight and the front transmission case 2 equipped with the forced-diff mechanism 41 in the forward lower section of the engine 10, a good longitudinal weight balance of the machine body can be obtained and a tilling machine or the like can be stably attached to the rear section of the machine body using the lower link 16. The difference in load from machine body weight on the front and rear sections of the traveling crawlers 9 can be reduced to reduce the difference in ground contact pressure to improve travel performance. The transmission case 25 and the rear transmission case 12 are installed in the rear section of the engine 10. The straight-ahead driving force of the rear transmission case 12 is allowed to enter the forced-diff 41 from the rear side, and the front transmission case 2 equipped with the forced-diff 41 mechanism is assembled by sharing front wheel driving parts constituting a wheel type travel mechanism such as, for example, the axle 3, its mounting parts, and transmission parts to reduce manufacturing costs by commonly using parts of the wheel type. In addition, the steering case 45 and the front transmission case 2 equipped with the forced-diff 41 mechanism are installed independently from the transmission case 25 and the rear transmission case 12 to minimize limitation of mounting positions of the steering case 45 and the front transmission case 2 equipped with the forced-diff 41 mechanism to allow an installation location to be easily changed.

As shown in FIG. 13, the driving sprockets 4 for transmitting traveling force to the traveling crawlers 9, and the equalizer wheels 7 serving as track rollers, are installed in where the floor exit angle "A" of the traveling crawler 9 becomes approximately 30 degrees or less. Ground contact length of the traveling crawlers 9 is determined by adjusting the mounting position of a foremost equalizer wheel 7 close to the driving sprocket 4, and the mounting position of the driving sprocket is longitudinally changed while keeping swing resistance almost constant. Thus effective ground contact length is increased by ground contact of the front section of the traveling crawlers 9 with a floor exit angle "A" of 30 degrees or less on a soft surface requiring deeper penetration to secure traveling force. The ground contact length is decreased by the floor exiting the front section of the traveling crawlers 9 on a hard surface requiring less penetration to reduce the swing resistance to improve mobility.

The rear transmission case 12 is installed in the rear section of the engine 10 through the hydraulic transmission type transmission case 25, and the universal joint shaft 43 serving as a travel drive shaft for transmitting straight-ahead driving force to the traveling crawlers 9 is extended forward from the transmission case 12. The front transmission case 2 equipped with the forced-diff 41 mechanism is installed in the forward lower section of the engine 10, hydraulic transmission steering case 45 for transmitting output of the engine 10 from the front side is installed to the front side of the front transmission case 2 equipped with the forced-diff 41 mechanism, the universal joint shaft 43 is connected to the rear side of the front transmission case 2 equipped with the forced-diff 41 mechanism from the rear side, driving force of the steering case 45 is allowed to enter from the front side of the front transmission case 2 equipped with the forced-diff 41 mechanism, right and left final cases 100 are installed to both sides of the front transmission case 2 equipped with the forced-diff 41 mechanism, and the driving sprockets 4 for the right and left traveling crawlers 9 are installed in the final cases 100 through the axles 3. Thus components with heavy weight disposed in the machine body are longitudinally distributed to improve longitudinal balance of the machine body, and the steering case 45 and the front transmission case 2 equipped with the forced-diff 41 mechanism are installed independently from the transmission case 25 and the rear transmission case 12 to simplify the drive structure of the traveling crawlers 9, reduce the manufacturing costs, and improve the travel performance using the traveling crawlers 9 and the workability on a farmland.

Figure 18:
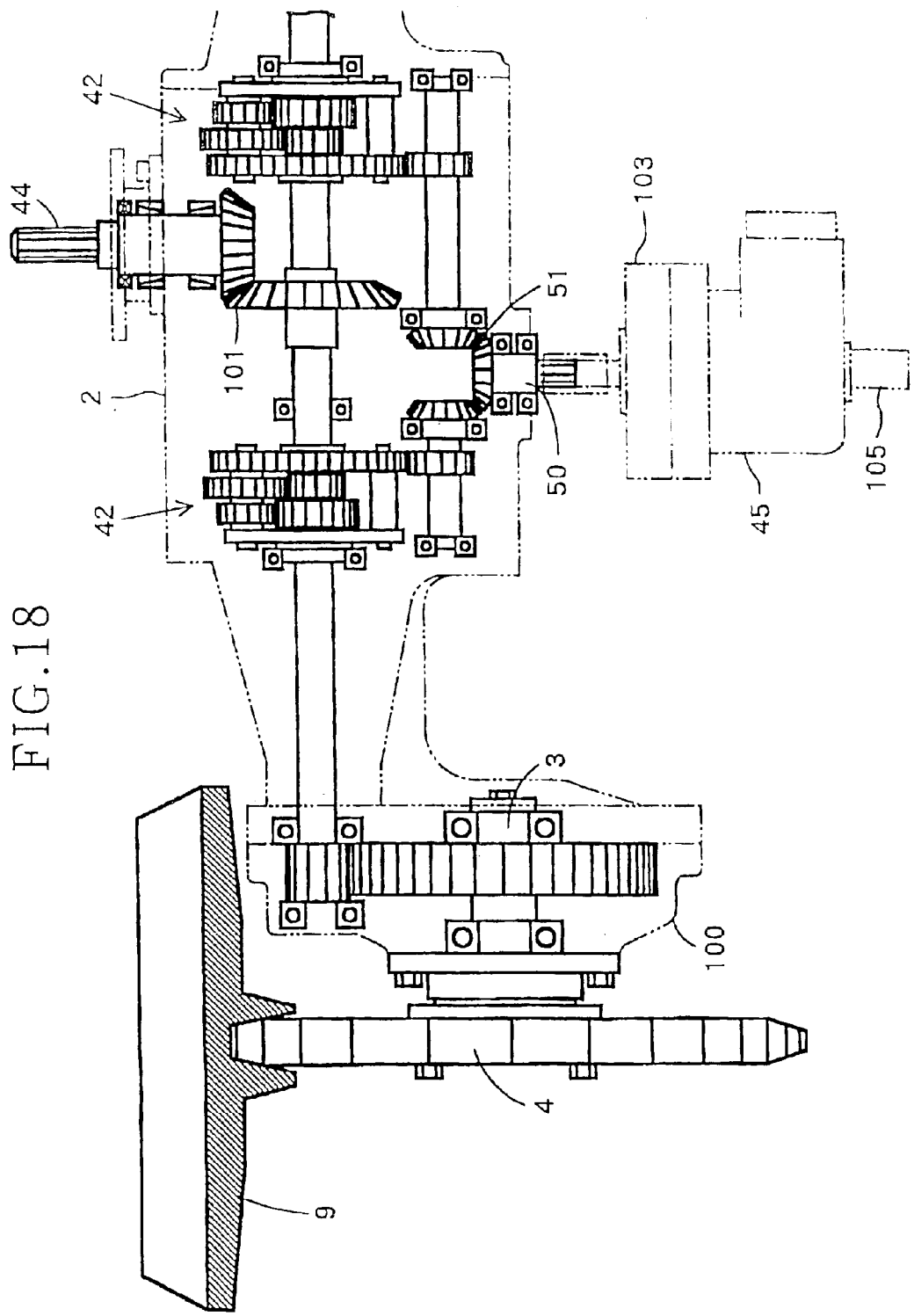
FIG. 18 is an explanatory partial plain view of the same.

The universal joint shaft 43 is extended in a manner horizontally slanted from the longitudinal centerline of the machine body, the connecting section of a bevel gear 101 of the differential input shaft 44 is arranged to the left side of a connecting section of the bevel gear 51 of the motor shaft 50 as shown in FIG. 18, and the differential input shaft 44 in an input position of the universal joint shaft 43 at the rear side of the front transmission case 2 equipped with the forced-diff 41 mechanism is shifted to the left to minimize longitudinal width of the front transmission case 2 serving as a casing of the forced-diff 41 mechanism equipped with the steering case 45 at the front side in a position of a machine body center to effectively utilize the lateral mounting space of the front transmission case 2 with less size limitations to simplify or reduce the size of the front transmission case 2 structure equipped with the forced-diff mechanism 41.

As shown in FIG. 13 through FIG. 16, the right and left front cabin pedestals 77 and the rear cabin pedestals 78 are connected through the right and left side frames 102 to reinforce support strength of the cabin 17 of the crawler frames 1 connected to each of the cabin pedestals 77 and 78 by installing the side frames 102. The steering case 45 is fixed to the front side of the front transmission case 2 through the gear case 103, the steering input shaft 104 connected to the pump shaft 48 through gears is protruded from the upper rear face of the gear case 103, the steering input shaft 104 is connected to the output shaft 29 of the engine 10 through the universal joint shaft 49, the steering case 45 is installed in a position lower than that of the output shaft 29 in front of the engine 10, and the cooling parts, such as a radiator and an oil cooler, are installed inside the bonnet 11 above the steering case 45.

Figure 14:
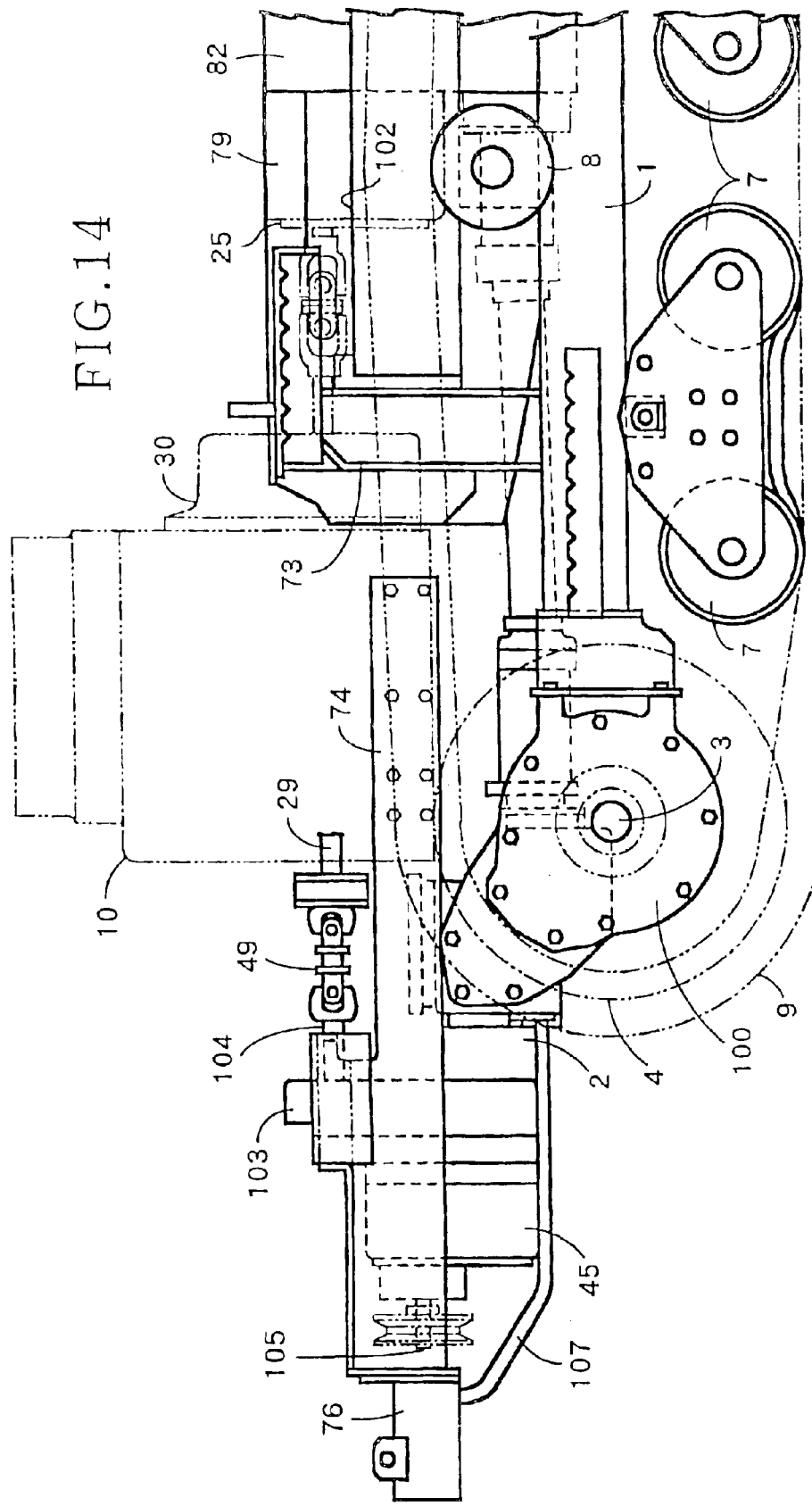
FIG. 14 is a partial enlargement view of FIG. 13.
Figure 15:
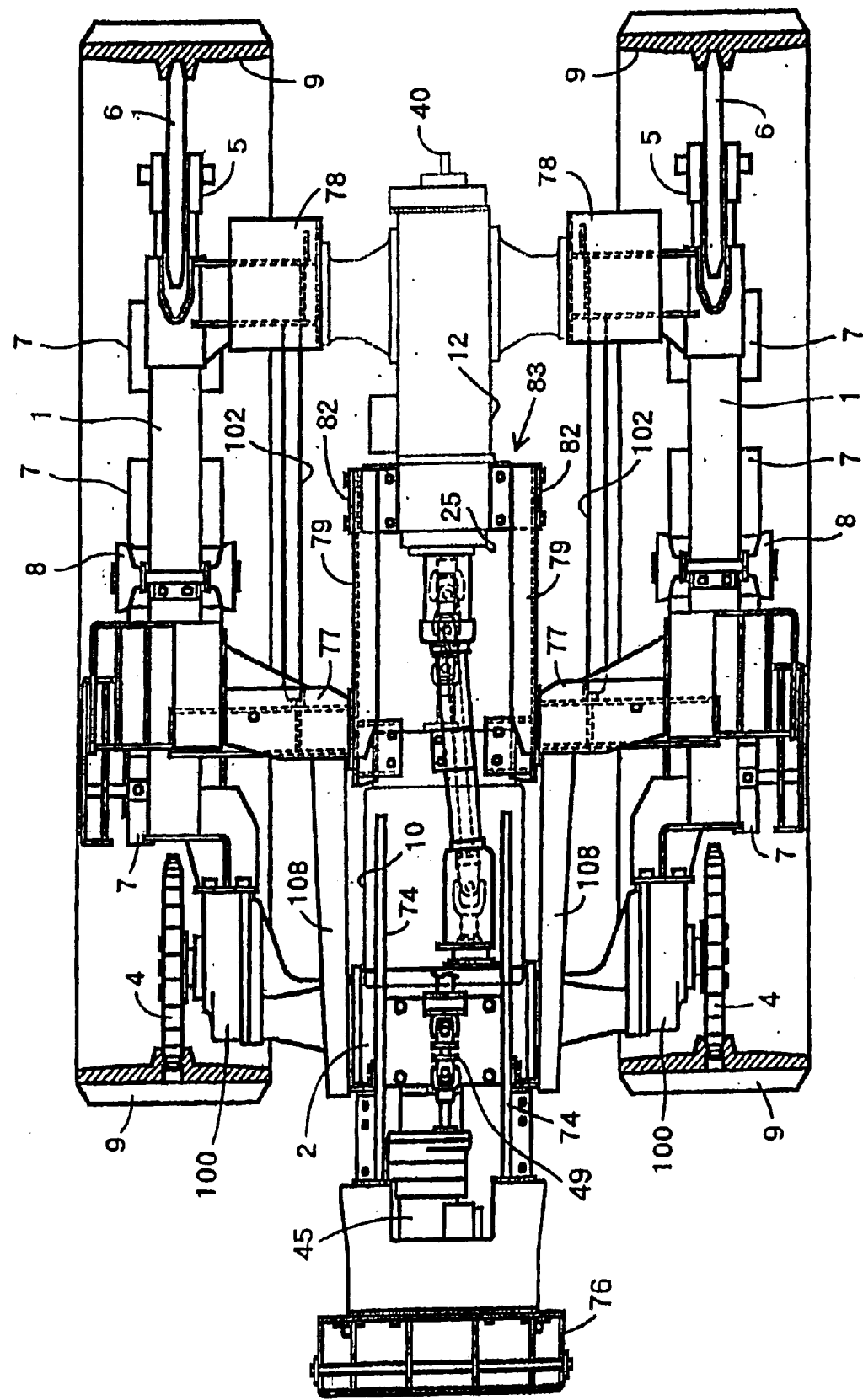
FIG. 15 is a plain view of FIG. 13.
Figure 16:
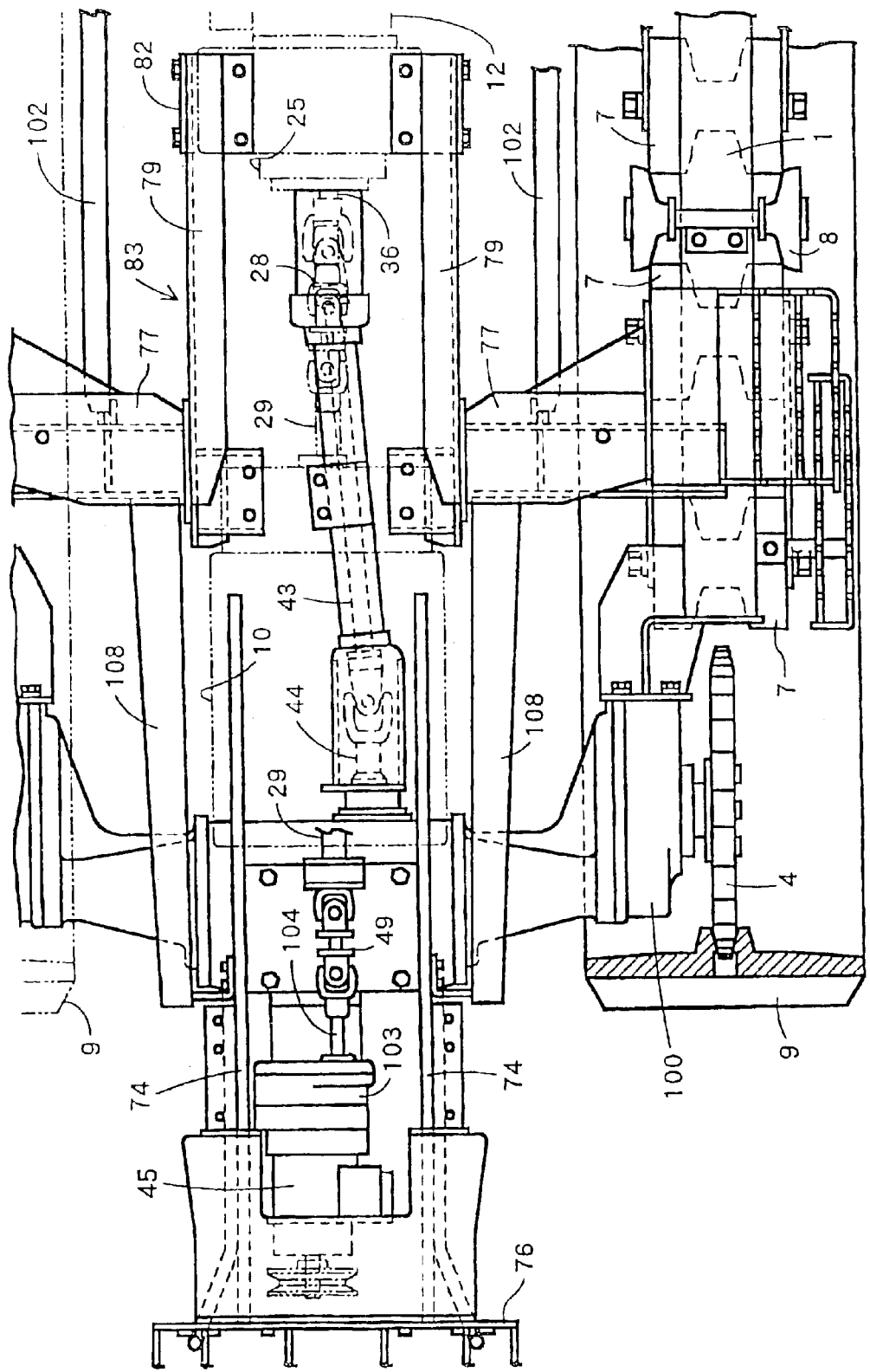
FIG. 16 is a partial enlargement view of FIG. 15.
Figure 17:
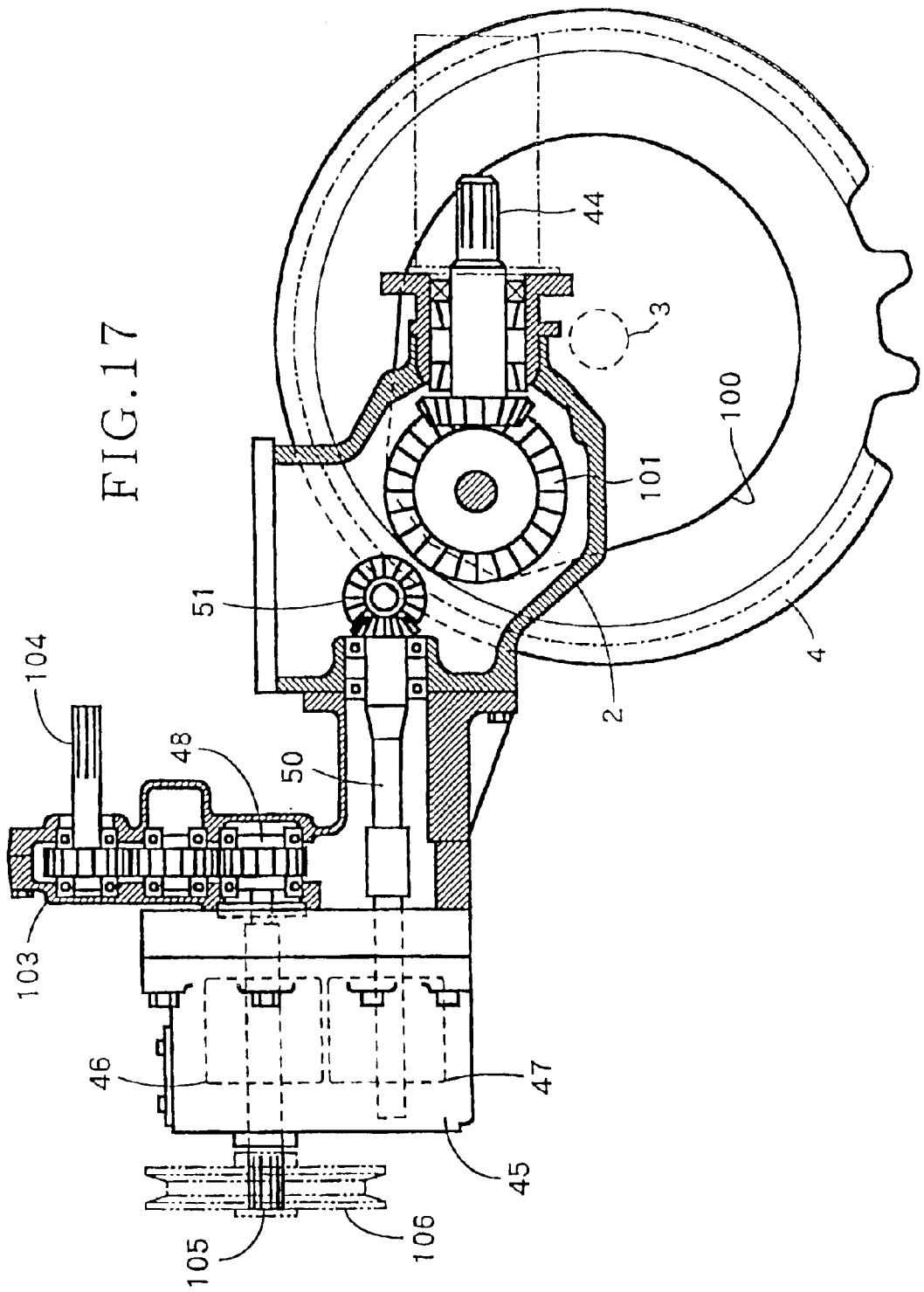
FIG. 17 is an explanatory partial enlargement side view of FIG. 13.

The front PTO shaft 105 is formed by protruding the pump shaft 48 to the forward side of the steering case 45, the pulley 106 for V-belts is installed to the front PTO shaft 105 if necessary, and when a machine, such as a fertilizer sprinkling machine, is attached to the front bumper 76, work power is derived from the front PTO shaft 105. Thus both sides of the steering case 45 are protected by the right and left engine frames 74, the bottom face of the steering case 45 is protected by the bottom bumper 107 as shown in FIG. 14, and reinforcing frames 108 are installed outside the engine frames 74 as shown in FIG. 16 to increase the strength of the right and left front cabin pedestals 77 for supporting the engine 10 by the right and left reinforcing frames 108.

What is claimed is:

1. A tractor comprising:

an engine;

a hydraulic transmission swing mechanism and a hydraulic transmission straight-ahead driving mechanism driven by said engine, said straight-ahead transmission having a transmission case;

a forced-diff for combining output of said swing transmission and said straight-ahead transmission;

right and left traveling crawlers driven by said forced-diff;

a first connecting unit comprising said swing transmission and said forced-diff, wherein said first connecting unit is installed forward of said engine and longitudinally spaced from said engine by a first predetermined distance;

a second connecting unit comprising said straight-ahead transmission and said transmission case, wherein said second connecting unit is installed rearward of said engine and longitudinally spaced from said engine by a second predetermined distance; and a machine floor installed between said engine and said second connection unit.

2. The tractor of claim 1, having right and left driving sprockets, wherein said first connection unit is disposed between said right and left sprockets.

3. The tractor of claim 1 or 2, having a longitudinal centerline and a width, said tractor further comprising:

a travel driving shaft for outputting straight-ahead driving force to said forced-diff, said shaft extending forward from said transmission case so that, in a plan view, said shaft slants away from said longitudinal centerline; and a first input position defined by a line between said swing transmission and said forced-diff, and a second input position defined by a line between said straight-ahead transmission and said forced-diff, wherein said first and second input positions are offset from each other with respect to said tractor width.

* * * * *